Figure 4:
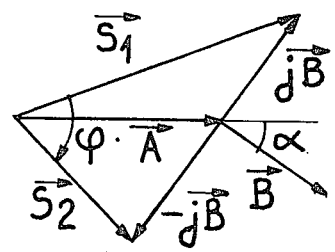

United States Patent [19]

Charlot et al.

[11] 4,139,850

[45] Feb. 13, 1979

[54] ARRANGEMENT FOR DETECTING THE PRESENCE OF RADAR ECHOS IN A PULSED RADAR SYSTEM

[75] Inventors: Jean C. Charlot; Pierre Cardinet, both of Paris, France

[73] Assignee: Thomson-CSF, Paris, France

[21] Appl. No.: 832,951

[22] Filed: Sep. 13, 1977

[30] Foreign Application Priority Data

Sep. 17, 1976 [FR] France ............................... 76 28022

[51] Int. Cl.$^2$ ............................................... G01S 9/22
[52] U.S. Cl. ............................. 343/16 M; 343/17.1 R
[58] Field of Search ............. 343/17.1 R, 13 R, 16 M, 343/5 PD

[56] References Cited

U.S. PATENT DOCUMENTS

| | | | |
|---|---|---|---|
| 3,560,974 | 2/1971 | Le Courtier et al. ............. | 343/16 M |
| 3,958,242 | 5/1976 | Sirven .............................. | 343/16 M |
| 4,064,510 | 12/1977 | Chabah ........................... | 343/16 M |

*Primary Examiner*—Maynard R. Wilbur
*Assistant Examiner*—Lawrence Goodwin
*Attorney, Agent, or Firm*—Cushman, Darby & Cushman

[57] ABSTRACT

The invention relates to arrangement for detecting the presence of echos for a multi-range-gate radar system. The signal $\vec{A}$ from a gate is combined with a signal $\vec{B}$ from one or more neighboring gate. This combination is performed by means of an operator which supplies signals $\vec{S}_1 = \vec{A} + k_1\vec{B}$ and $S_2 = k_2(\vec{A} - k_1\vec{B})$, where $k_1$ and $k_2$ are complex coefficients. A demodulator receiving $\vec{S}_1$ and $\vec{S}_2$ supplies a signal proportional to the cosine of the phase between $\vec{S}_1$ and $\vec{S}_2$. Said cosine signal is sampled, filtered and compared to a threshold. When exceeding said threshold the output signal indicates that an echo signal is received.

10 Claims, 8 Drawing Figures

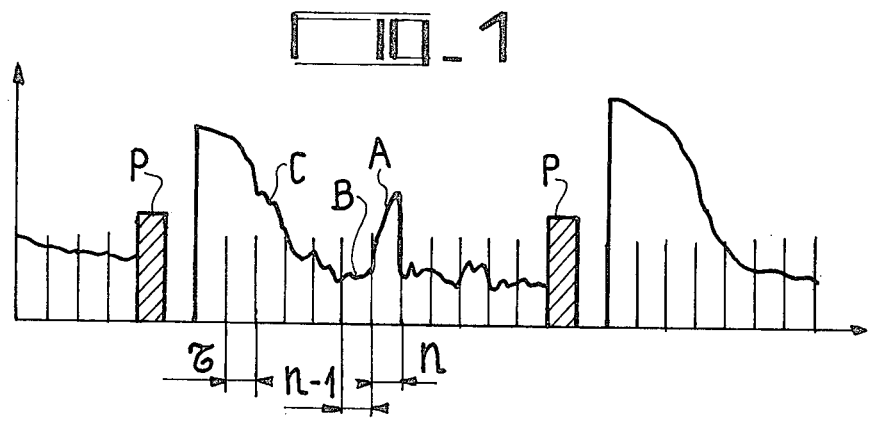
FIG_1
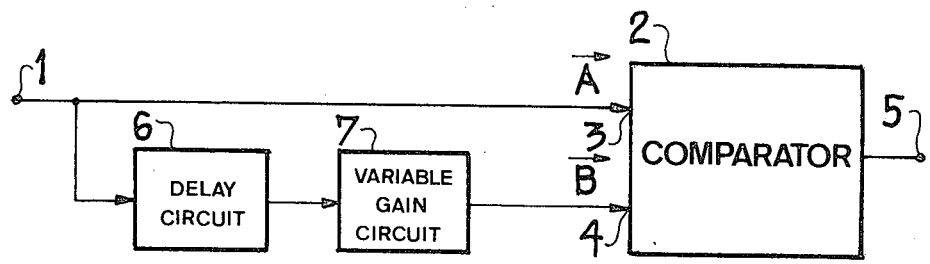
FIG_2
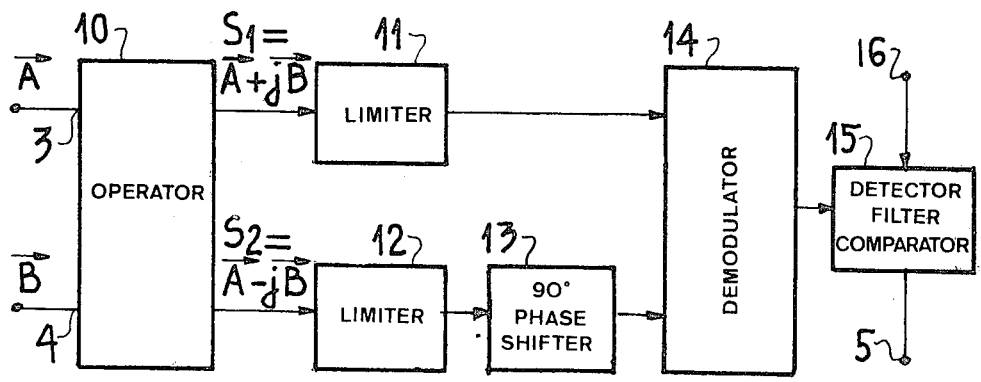
FIG_3

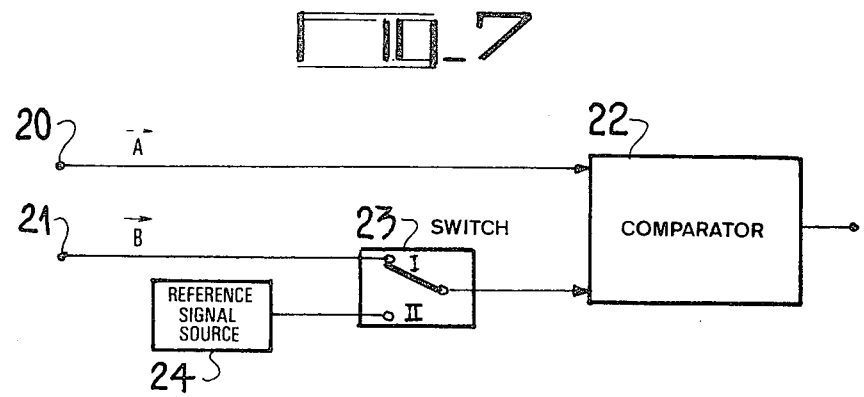
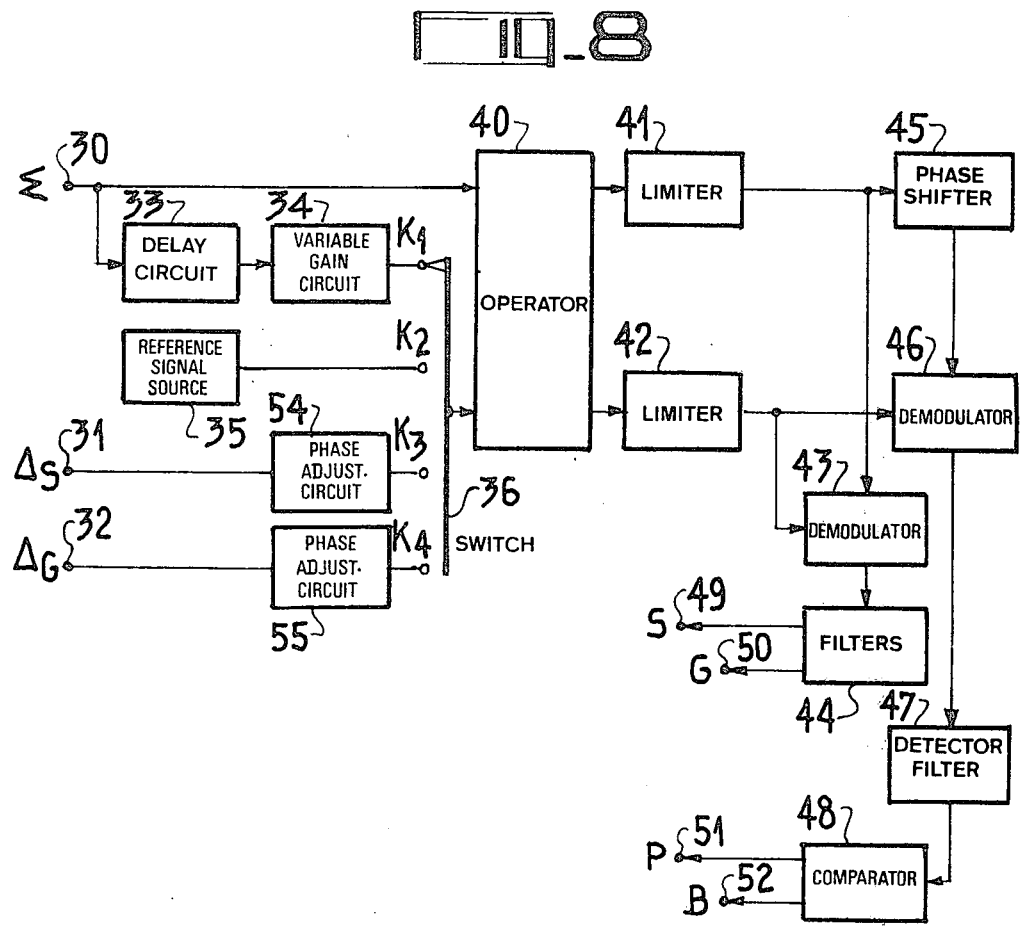

ARRANGEMENT FOR DETECTING THE PRESENCE OF RADAR ECHOS IN A PULSED RADAR SYSTEM

This invention relates to pulsed radar systems and more particularly to arrangements which enable the presence of one or more echos to be detected. In such a radar system, the emission of a pulse is followed by a reception period which is divided up into range gate intervals whose duration is substantially equal to the duration of the pulses. The signal which is picked up by the receiver during this reception period may contain one or more useful echos, but it also contains noise and interference echos due to the surroundings of the target or targets. These interference echos are known as "clutter". The problem thus consists of recognising one or more useful signals from amongst the clutter signals. A first solution, which consists in comparing the level of the received signals with a threshold, requires the threshold to be set above the level of the clutter. Since the latter is very variable, particularly as a function of distance, such a solution cannot be considered satisfactory. It is preferable to compare the level of the signal in a range gate with that in one of the adjoining gates or with the mean of the signal levels in the two adjoining gates. This amounts to comparing the power of an echo received in a gate with that of the clutter preceding and/or following the detected target.

Such a solution makes it possible to escape the limitations imposed by attenuation, which is inversely proportional to distance to the power source. However the comparison of amplitude can only be performed on video signals. The instantaneous amplitude dynamic of the receiver which supplies the video signals, however, is less than that of the signals which are applied to it. It is necessary for the receiver to include an automatic gain control (AGC) circuit.

Since the frequency at which the clutter fluctuates is generally less than 100 Hertz, the AGC circuit may in principle have a narrow pass band of the same order of magnitude. The action of the AGC circuit is therefore exerted over a fairly large number of repetition cycles. This, however, creates a large number of difficulties in present day radar systems. In single-gate agile frequency radar systems, for example, the gain of the receiver is different from one transmission frequency to another. It is therefore necessary to have the same number to AGC circuits as there are transmitted frequencies or to use a single circuit which includes a multiple integrator. In multi-gate radars it is no longer possible to make do with a single, narrow band AGC circuit. The frequency band needs to be related to the duration of the gate. The AGC circuit becomes an instantaneously operating circuit (IAGC) but it is then a very elaborate and expensive circuit. In addition, if the radar system is of the monopulse type, since the angular measuring circuits cannot operate under IAGC, it is necessary to add to the system one complete ancillary reception channel containing a receiver and an IAGC circuit to enable the useful echos to be detected.

This solution is complicated, expensive and incompatible with the radar being used on board an aircraft or a missile.

The presence detecting arrangement according to the invention does not suffer from these disadvantages.

One object of the present invention is in particular to avoid the use of AGC circuits.

In accordance with a feature of the invention, there is provided an arrangement for detecting the presence of an echo signal $\vec{A}$ received in a range gate with respect to a signal $\vec{B}$ received in at least one adjoining range gate, said arrangement comprising:

an operating circuit for receiving said signals $\vec{A}$ and $\vec{B}$ and supplying output signals $\vec{S}_1 = \vec{A} + k_1\vec{B}$ and $\vec{S}_2 = k_2(\vec{A} - k_1\vec{B})$, where $k_1$ and $k_2$ are amplitude and phase modifying complex coefficients;

demodulating means for demodulating one of said signals $\vec{S}_1$ and $\vec{S}_2$ by the other;

sampling, filtering and comparing means, connected to the output of said demodulating means for sampling, filtering and comparing the output signal of said demodulating means to a predetermined threshold and providing a logical presence signal indicating the presence or the absence of an echo signal in said range gate.

If the threshold is exceeded, this indicates that a useful echo has been detected in the range gate containing signal $\vec{A}$.

Signal $\vec{B}$ is obtained by using a delay circuit which emits the signal from the previous range gate with a delay equal to the duration of range gate.

Signal $\vec{B}$ may also be obtained by forming the mean of the signals from the two or more range gate which precede and follow the gate under scrutiny.

The presence detecting arrangement according to the invention no longer needs to have video signals applied to it. The applied signal may with advantage be microwave signals or else intermediate frequency signals. The relative phases of signals $\vec{A}$ and $\vec{B}$ are thus of no importance.

Another advantage of the invention lies in the fact that in a radar system of the monopulse type, the circuits for measuring angular divergence may also be used to perform the presence detection. The number of circuits to be added to the system is then very small and this reduces both cost and bulk. This advantage is of particular value in the case of airborne systems.

Figure 5:
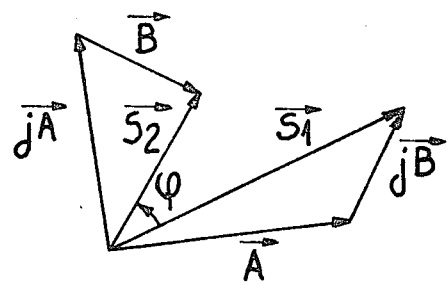
Figure 6:
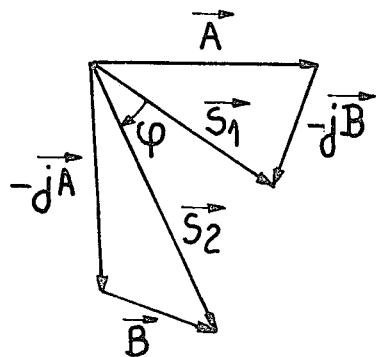

Other advantages and features of the invention will become apparent from the following description, which is illustrated by the Figures which show:

FIG. 1, a diagram of the amplitude of the received signal in a pulsed radar with respect to time, FIG. 2, a block diagram of an arrangement for detecting the presence of useful echos, FIG. 3, a presence detecting arrangement according to the invention, FIGS. 4, 5 and 6, vector diagrams of the signals A and B from adjoining range gates, FIG. 7 a presence and interference source detecting system, and FIG. 8, a general diagram of a multi-function system.

FIG. 1 is a simplified diagram of the received signal in a pulsed radar as a function of time. Pulses P are emitted at each repetition cycle. The reception period which follows the emission of each pulse P is divided into range intervals by range gates whose duration $\tau$ is substantially equal to the duration of the pulses P. The received signal may for example contain a target echo A which occurs in the $n^{th}$ gate. In all the other gates the signal represents clutter. The amplitude of the clutter decreases as a function of range and the amplitude of signal A is greater than that of the clutter in the $(n-1)^{th}$ and the $(n+1)^{th}$ gate. It is this difference in amplitude that the presence detecting arrangement will cause to become apparent. The presence of a target is not of course shown up in a single repetition cycle but in the course of a large number of repetition cycles, the successive detections in the successive repetition cycles then being filtered by integration. It is the final filtered signal which, when compared with a predetermined reference threshold, indicates with virtual certainty the presence (if the threshold is exceeded) or the absence (in the opposite case) of a detected target in a range gate.

The circuits of the presence detecting arrangement are shown in a very general form in FIG. 2. Omitting the transmission members, the antennas, and the members for separating the emitted and received signals, which are not pertinant to the invention, the Figure indicates that the signals received by the system are applied to an input terminal 1. In the course of each repetition cycle the signals in the range gate follow on from one another. The signal $\vec{A}$ from one gate is compared, in a comparator circuit 2, with the signal $\vec{B}$ from an adjoining gate. This signal $\vec{B}$ may be either the signal from the preceding gate or that from the following gate or the mean of the signals from both the adjoining gate. By way of example, FIG. 2 shows an arrangement for making a comparison between the signal $\vec{B}$ from a gate after it has been delayed by the duration $\tau$ of a gate, and the signal $\vec{A}$ from the next gate. If the amplitude of signal $\vec{A}$ is greater than that of signal $\vec{B}$, this means that a target has been detected in the relevant gate and a logic signal appears at the output 5 of comparator 2. The delay to signal $\vec{B}$ is achieved by means of a delay circuit 6 connected to input 1, which is followed by a variable gain circuit 7 in order to allow a balance to be achieved between the two channels, namely the direct one which supplies the signal $\vec{A}$ to a terminal 3 of comparator 2 and the delayed channel which supplies signal $\vec{B}$ to a terminal 4.

FIG. 3 is a detailed view of an embodiment of the structure of the comparator 2 which is the subject of the invention. The signals $\vec{A}$ and $\vec{B}$ are shown and referred to in a conventional vector form since they are no longer video signals but signals on a carrier which are characterised at any given moment by an amplitude value and a phase value. In principle, the two signals $\vec{A}$ and $\vec{B}$ are of the same frequency but they may have between them a phase difference. It will be seen in the remainder of the description that this phase difference in no way affects the comparison of the amplitudes of $\vec{A}$ and $\vec{B}$, which endows the invention with its chief advantage.

An operating circuit 10 receives signal $\vec{A}$ from terminal 3 and signal $\vec{B}$ from terminal 4. By rotating one of the vectors through ±90° and adding or subtracting the other vector, the operating circuit 10 makes a linear combination of the vectors $\vec{A}$ and $\vec{B}$ and thus supplies two signals, $\vec{S}_1 = \vec{A} + j\vec{B}$ and $\vec{S}_2 = \vec{A} - j\vec{B}$, for example. The amplitude of these signals is limited in limiting amplifiers 11 and 12. Signal $\vec{S}_2$ undergoes a 90° phase rotation in a phase-shifter 13 and is then applied to a demodulator 14. The other signal $\vec{S}_1$ is likewise applied to the demodulator. The demodulator 14 demodulates the amplitude and phase of signal $\vec{S}_1$ by means of signal $j\vec{S}_2$, which gives a signal proportional to the scalar product of $\vec{S}_1$ and $j\vec{S}_2$.

It can easily be shown that if the amplitude of $\vec{A}$ is greater than the amplitude of $\vec{B}$, the output signal from the demodulator is positive, whilst in the opposite case it is negative, and that this result is completely independant of the phase difference $\alpha$ between $\vec{A}$ and $\vec{B}$.

A circuit 15 for detecting, filtering and performing a comparison with a reference threshold which is applied to terminal 16, receives the output signal from the demodulator and integrates this signal, as explained above, in order to take into account a number of repetition cycles. However, it should be noted that comparator 15 may also contain both first circuitry components for detecting, filtering and comparing the output signal of the demodulator with a first threshold and a second circuitry components in series with the first components for making comparisons with a second threshold and for providing a logical presence signal indicating the presence or absence of an echo signal in the range gate. The structure of this circuit 15 is not shown in detail since it will be familiar to those skilled in the art who are versed in techniques for integrating recurring series of signals. As a reminder, the signals corresponding to the various windows are integrated separately either in an equal number of parallel filters or in a single multiple filter such as the multiple integrator which is described in U.S. Pat. No. 3,979,752 filed with the priority of French Pat. No. 2,278,204.

The operating circuit 10 is also familiar to those skilled in the art and is to be found in particular in any receiver of the monopulse type. The manner of combining the vectors $\vec{A}$ and $\vec{B}$ used in the example in FIG. 3 is not the only way possible. In general terms, the signals $\vec{S}_1$ and $\vec{S}_2$ will be obtained by combinations of the type $\vec{S}_1 = \vec{A} + k_1\vec{B}$ and $\vec{S}_2 = k_2 \times (\vec{A} - k_1\vec{B})$, in which case the values of $k_1$ and $k_2$ may be equal to $\pm 1$ or $\pm j$, $j$ being the rotation operator of $+\pi/2$. FIGS. 4, 5 and 6 show three possible combinations of the signals $\vec{A}$ and $\vec{B}$, which are shown in vector form. The phase difference $\alpha$ between signals $\vec{A}$ and $\vec{B}$ has no bearing on the result at the output of the demodulator. FIG. 4 shows the two signals $\vec{A}$ and $\vec{B}$ and the signals $\vec{S}_1 = \vec{A} + j\vec{B}$ and $\vec{S}_2 = \vec{A} - j\vec{B}$, ($k_1 = j, k_2 = 1$). The vector product of $\vec{S}_1$ and $\vec{S}_2$ is equal to the product of the moduli of $\vec{S}_1$ and $\vec{S}_2$ and the cosine of the angle $\phi$ between $\vec{S}_1$ and $\vec{S}_2$. The value of $\cos \phi$ has the same sign as the difference between the squares of the moduli of $\vec{A}$ and $\vec{B}$.

In FIG. 5, the signals formed in the operating circuit $\vec{S}_1 = \vec{A} + j\vec{B}$ and $\vec{S}_2 = j\vec{A} + \vec{B}$. After demodulation, the value which is obtained for $\sin \phi$ is of the same sign as:

$$A^2 - B^2 (k_1 = -j, k_2 = -j).$$

In FIG. 6, the operating circuit forms the signals $\vec{S}_1 = \vec{A} - j\vec{B}$ and $\vec{S}_2 = \vec{B} - j\vec{A}$ and the demodulator provides a measurement for $\sin \phi$ which is of the same sign as:

$$B^2 - A^2 (k_1 = -j, k_2 = -j).$$

It will be noted that the presence detecting circuit requires a circuit for shifting the phase of signal $\vec{S}_1$ by 90° before demodulation in the case of FIG. 5, a circuit for shifting the phase of signal $\vec{S}_2$ by 90° in the case of FIG. 6, and for there to be no phase shifter in the case of FIG. 4. In other cases, for other values of $k_1$ and $k_2$, those skilled in the art will know how to determine whether a phase shifter is necessary and where it is to be positioned.

FIG. 7 shows an improvement to the invention which enables it to be discovered whether an echo results from a genuine target or from an interference source. This device employs a two-position switch 23 which is inserted in one of the input channels of the presence detecting arrangement 22. The signal $\vec{A}$ from the gate being examined is applied to input 20 and the signal $\vec{B}$ which is compared with $\vec{A}$ is applied to input 21. The detection of the presence of echos takes place when switch 23 is in position I. When the switch changes over to position II, it applies to the input of comparator 22 not signal $\vec{B}$ but a reference signal supplied by a generator 24. If a comparison, which is performed in the same way as the presence detection, indicates that signal $\vec{A}$ is greater than the reference signal, what is involved is an interference source.

FIG. 8 shows a more comprehensive radar system which is provided with an antenna of the monopulse type (not shown). This antenna supplies a sum signal $\Sigma$, an elevation difference signal $\Delta S$ and a bearing difference signal $\Delta G$.

The circuits which are normally used to measure divergences S and G consist of an operator 40, which is followed by two limiters 41 and 42 which apply signals to the demodulator 43, which provides angular measurements for S or G. Phase-adjusting circuits 54 and 55 are also inserted in the $\Delta G$ and $\Delta S$ channels. The usefulness of the invention lies in the fact that the circuits for making angular measurements and those of the arrangement for presence detection may in part be common.

It is therefore necessary to employ a four position switch 36 which applies the various signals to the amplitude comparison circuits by using timesharing techniques.

Also, the sum signal $\Sigma$ which serves as a reference for the angular measurements and which contains the signals from the range gate is applied directly from an input terminal 30 to operating circuit 40.

A delay circuit 33 followed by an amplifier 34 applies the delayed signal $\vec{B}$ to terminal $K_1$ of the switch to allow the presence of a target to be detected.

A reference signal supplied by a generator 35 is applied to terminal $K_2$ of the switch.

After being brought into phase, signal $\Delta S$ and signal $\Delta G$ are applied to terminals $K_3$ and $K_4$ of the switch via input terminals 31 and 32. The moving contact of switch 36 is connected to the second input of operating circuit 40.

The two limiters 41 and 42 and the demodulator 43 emit the basic signals S and G for angular divergence when switch 36 is in positions $K_3$ and $K_4$, respectively. These signals are filtered separately in circuit 44 which will be familiar to specialists in monopulse radar. The output terminals 49 and 50 supply the signals S and G.

A phase shifter 45 connected to the output of limiter 41 and a demodulator 46 which receives the signals from phase shifter 45 and from limiter 42 emits the signals for target detection and interference detection when the switch 36 is in positions $K_1$ and $K_2$ respectively. As in the case of FIG. 3, there are circuits 47 and 48 which are responsible for detecting, sampling, filtering and comparing the detected signals. As was the case with comparator 15 shown in FIG. 3, comparator 48 may contain circuitry for comparing the demodulator output signal to a first and a second threshold. Output terminals 51 and 52 emit logic signals which indicate the presence of a genuine target and the presence of an interference source respectively.

As indicated above, the position of the 90° phase shifting circuit 45, and whether it is present at all, depend upon the vector combination which is performed by operator 40; whereas the output signal from demodulator 46 needs to be proportional to the cosine of the angle between vectors $\vec{S_1}$ and $\vec{S_2}$, that from demodulator 43 needs to be proportional to the sine of the same angle. The solutions described are given merely by way of non-limiting example.

The system which is shown in FIG. 8 demonstrates the essential advantage of the invention, namely the considerable saving achieved in circuits, and thus in the overall cost and size of the radar system achieved.

The chief application of the invention is to airborne radars. It is also applicable to all kinds of pulsed radar.

Of course the invention is not limited to the embodiment described and shown which was given solely by way of example.

What is claimed:

1. In a radar system, an arrangement for detecting the presence of an echo signal $\vec{A}$ received in a range gate with respect to a signal $\vec{B}$ received in at least one adjoining range gate, said arrangement comprising:
   an operating circuit for receiving said signals $\vec{A}$ and $\vec{B}$ and supplying output signals $\vec{S_1} = \vec{A} + k_1\vec{B}$ and $\vec{S_2} = k_2(\vec{A} - k_1\vec{B})$, where $k_1$ and $k_2$ are amplitude and phase modifying complex coefficients;
   demodulating means for demodulating one of said signals $\vec{S_1}$ and $\vec{S_2}$ by the other;
   sampling, filtering and comparing means, connected to the output of said demodulating means for sampling, filtering and comparing the output signal of said demodulating means to a predetermined threshold and providing a logical presence signal indicating the presence or the absence of an echo signal in said range gate.

2. In a radar system, an arrangement for detecting the presence of an echo signal $\vec{A}$ received in a range gate with respect to a signal $\vec{B}$ received in at least one adjoining range gate, said arrangement comprising:
   an operating circuit for receiving said signals $\vec{A}$ and $\vec{B}$ and supplying output signals $\vec{S_1} = \vec{A} + K_1 \vec{B}$ and $\vec{S_2} = k_2(\vec{A} - k_1\vec{B})$ where $k_1$ and $k_2$ are amplitude and phase modifying complex coefficients;
   demodulating means for demodulating one of said signals $\vec{S_1}$ and $\vec{S_2}$ by the other; and
   sampling, filtering and comparing means connected to the output of said demodulating means for sampling, filtering and comparing the output signal of said demodulating means to a first and second predetermined threshold, said comparing means providing a logical presence signal indicating the presence or absence of an echo signal in said range gate.

3. In a radar system, an arrangement for detecting the presence of an echo signal $\vec{A}$ received in a range gate with respect to a signal $\vec{B}$ received in at least one adjoining range gate, said arrangement comprising:
   an operating circuit for receiving said signals $\vec{A}$ and $\vec{B}$ and supplying output signals $\vec{S_1} = \vec{A} + k_1\vec{B}$ and $\vec{S_2} = k_2(\vec{A} - k_1\vec{B})$, where $k_1$ and $k_2$ are amplitude and phase modifying complex coefficients;
   90° phase shifting means connected to one output of said operating circuit;
   demodulating means, connected to the other output of said operating circuit and to the output of said phase shifting means for demodulating one of said signals $\vec{S_1}$ and $\vec{S_2}$ in quadrature, by the other;
   sampling, filtering and comparing means, connected to the output of said demodulating means for sampling, filtering and comparing the output signal of said demodulating means to a predetermined threshold and providing a logical presence signal indicating the presence or the absence of an echo signal in said range gate.

4. In a radar system, an arrangement for detecting the presence of an echo signal A received in a range gate with respect to a signal B received in at least one adjoining range gate, said arrangement comprising:
- an operating circuit for receiving said signals $\vec{A}$ and $\vec{B}$ and supplying output signals $\vec{S_1} = \vec{A} + k_1\vec{B}$ and $\vec{S_2} = k_2(\vec{A} - k_1\vec{B})$ where $k_1$ and $k_2$ are amplitude and phase modifying complex coefficients;
- 90° phase shifting means connected to one output of said operating circuit;
- demodulating means, connected to the other output of said operating circuit and to the output of said phase shifting means for demodulating one of said signals $\vec{S_1}$ and $\vec{S_2}$ in a quadrature by the other; and
- sampling, filtering and comparing means connected to the output of said demodulating means for sampling, filtering and comparing the output signal of said demodulating means to a first and second predetermined threshold, said comparing means providing a logical presence signal indicating the presence or absence of an echo signal in said range gate.

5. In a radar system, an arrangement for detecting the presence of an echo signal $\vec{A}$ received in a range gate with respect to a signal $\vec{B}$ received in at least one adjoining range gate, said arrangement comprising:
- an operating circuit for receiving said signals $\vec{A}$ and $\vec{B}$ and supplying output signals $\vec{S_1} = \vec{A} + k_1\vec{B}$ and $\vec{S_2} = k_2(\vec{A} - k_1\vec{B})$, where $k_1$ and $k_2$ are amplitude and phase modifying complex coefficients;
- two limiting amplifiers respectively connected to the outputs of said operating circuit,
- demodulating means, connected to the output of said limiting amplifier, for demodulating one of said signals $\vec{S_1}$ and $\vec{S_2}$ by the other;
- sampling, filtering and comparing means, connected to the output of said demodulating means for sampling, filtering and comparing the output signal of said demodulating means to a predetermined threshold and providing a logical presence signal indicating the presence or the absence of an echo signal in said range gate.

6. In a radar system, an arrangement for detecting the presence of an echo signal $\vec{A}$ received in a range gate with respect to a signal $\vec{B}$ received in at least one adjoining range gate, said arrangement comprising:
- an operating circuit for receiving said signals $\vec{A}$ and $\vec{B}$ and supplying output signals $\vec{S_1} = \vec{A} + k_1\vec{B}$ and $\vec{S_2} = k_2(\vec{A} - k_1\vec{B})$, where $k_1$ and $k_2$ are amplitude and phase modifying complex coefficients;
- two limiting amplifiers respectively connected to the outputs of said operating circuit,
- 90° phase shifting means connected to the output of one of said limiting amplifier,
- demodulating means, connected to the output of the other limiting amplifier and to the output of the phase shifting means, for demodulating one of said signals $\vec{S_1}$ and $\vec{S_2}$ in quadrature by the other;
- sampling, filtering and comparing means, connected to the output of said demodulating means for sampling, filtering and comparing the output signal of said demodulating means to a predetermined threshold and providing a logical presence signal indicating the presence or the absence of an echo signal in said range gate.

7. In a radar system, an arrangement for detecting the presence of an echo signal A received in a range gate with respect to a signal B received in at least one adjoining range gate, said arrangement comprising:
- an operating circuit for receiving said signals $\vec{A}$ and $\vec{B}$ and supplying output signals $\vec{S_1} = \vec{A} + k_1\vec{B}$ and $\vec{S_2} = k_2(\vec{A} - k_1\vec{B})$ where $k_1$ and $k_2$ are amplitude and phase modifying complex coefficients;
- two limiting amplifiers respectively connected to the outputs of said operating circuit;
- demodulating means, connected to the output of said limiting amplifiers, for demodulating one of said signals $S_1$ and $S_2$ by the other; and
- sampling, filtering and comparing means connected to the output of said demodulating means for sampling, filtering and comparing the output signal of said demodulating means to a first and second predetermined threshold, said comparing means providing a logical presence signal indicating the presence or absence of an echo signal in said range gate.

8. In a radar system, an arrangement for detecting the presence of an echo signal $\vec{A}$ received in a range gate with respect to a signal $\vec{B}$ received in at least one adjoining range gate, said arrangement comprising:
- an operating circuit for receiving said signals $\vec{A}$ and $\vec{B}$ and supplying output signals $\vec{S_1} = \vec{A} + k_1\vec{B}$ and $\vec{S_2} = k_2(\vec{A} - k_1\vec{B})$ where $k_1$ and $k_2$ are amplitude and phase modifying complex coefficients;
- two limiting amplifiers respectively connected to the outputs of said operating circuit;
- 90° phase shifting means connected to the output of one of said limiting amplifiers;
- demodulating means, connected to the output of the other limiting amplifier and to the output of the phase shifting means, for demodulating one of said signals $\vec{S_1}$ and $\vec{S_2}$ in quadrature by the other; and
- sampling, filtering and comparing means connected to the output of said demodulating means for sampling, filtering and comparing the output signal of said demodulating means to a first and second predetermined threshold, said comparing means providing a logical presence signal indicating the presence or absence of an echo signal in said range gate.

9. An arrangement according to claim 1, further comprising a reference voltage generator and switching means for applying to said operating circuit alternately said signal $\vec{B}$ or said reference voltage.

10. A radar system of the monopulse type supplying a sum signal ($\Sigma$) and difference signals $\Delta S$ and $\Delta G$, said radar system comprising:
- an operator circuit having a first input for receiving a signal A identical to sum signal $\Sigma$, a second input for receiving a signal B, a first output for supplying a signal $S_1 = A + k_1B$ and a second output for supplying a signal $S_2 = k_2(A - k_1B)$,
- switching means for receiving and applying sequentially to the second input of said operator circuit one the signals $\Delta S$, $\Delta G$, a reference signal and signal $\Sigma$ after delay of at least one repetition cycle;
- two limiter circuits connected respectively to the outputs of the operator circuit;
- first demodulating means connected to output of said limiter circuits;
- filtering means connected to said first demodulating means output for delivering angular difference signals S and G;
- 90° shifting means connected to the output of one of said limiter circuits;
- second demodulating means connected to the output of the other limiter circuit and to the output of said phase shifting means;
- means for sampling, filtering and comparing the output signal of said second demodulating means with a predetermined threshold and for delivering a presence signal indicating that an echo signal is received.

* * * * *